Sept. 3, 1963 R. M. MAGNUSON 3,102,629
ARTICLE FEEDING APPARATUS AND METHOD
Original Filed Aug. 6, 1956 2 Sheets-Sheet 2

INVENTOR.
GENEVIEVE I. MAGNUSON,
EXECUTRIX OF THE ESTATE OF
ROY M. MAGNUSON, DECEASED.

BY *Allen and Chromy.*
ATTORNEYS

United States Patent Office 3,102,629
Patented Sept. 3, 1963

3,102,629
ARTICLE FEEDING APPARATUS AND METHOD
Roy M. Magnuson, deceased, late of Saratoga, Calif., by Genevieve I. Magnuson, executrix, Saratoga, Calif., assignor of one-half to said Genevieve I. Magnuson, and one-half to Genevieve I. Magnuson, Robert Magnuson, and Lois J. Fox as trustees
Original application Aug. 6, 1956, Ser. No. 602,355, now Patent No. 2,990,665. Divided and this application Sept. 19, 1960, Ser. No. 57,072
5 Claims. (Cl. 198—34)

This application is a division of the co-pending application Serial No. 602,355, filed August 6, 1956, for Article Feeding Apparatus and Method, now Patent No. 2,990,665.

The present invention relates to methods and apparatus for arranging articles in a single file from an indiscriminate mass of such articles and is concerned more particularly with an apparatus and method embodying or employing a flume wherein the articles are placed or dumped into a body of water and the flow of liquid and articles is controlled so that the articles are in single file relation.

It is the general object of this invention to provide improved methods and apparatus for placing articles in single file.

Another object of the invention is to provide methods and apparatus of the above character in which liquid is employed as a conveying medium during a part of the single filing operation.

Other objects of this invention will be apparent from the following description of a preferred embodiment thereof, taken in connection with the attached drawings, in which.

The invention as illustrated is employed in a device of the character described in the co-pending application, Serial No. 602,355, wherein the apparatus fills the articles one by one into a container by count. The present method and apparatus is directed toward placing of the articles in a single file relation without reference to the spacing apart of the articles in the single file for use in the above counting and feeding apparatus.

Figure 1:
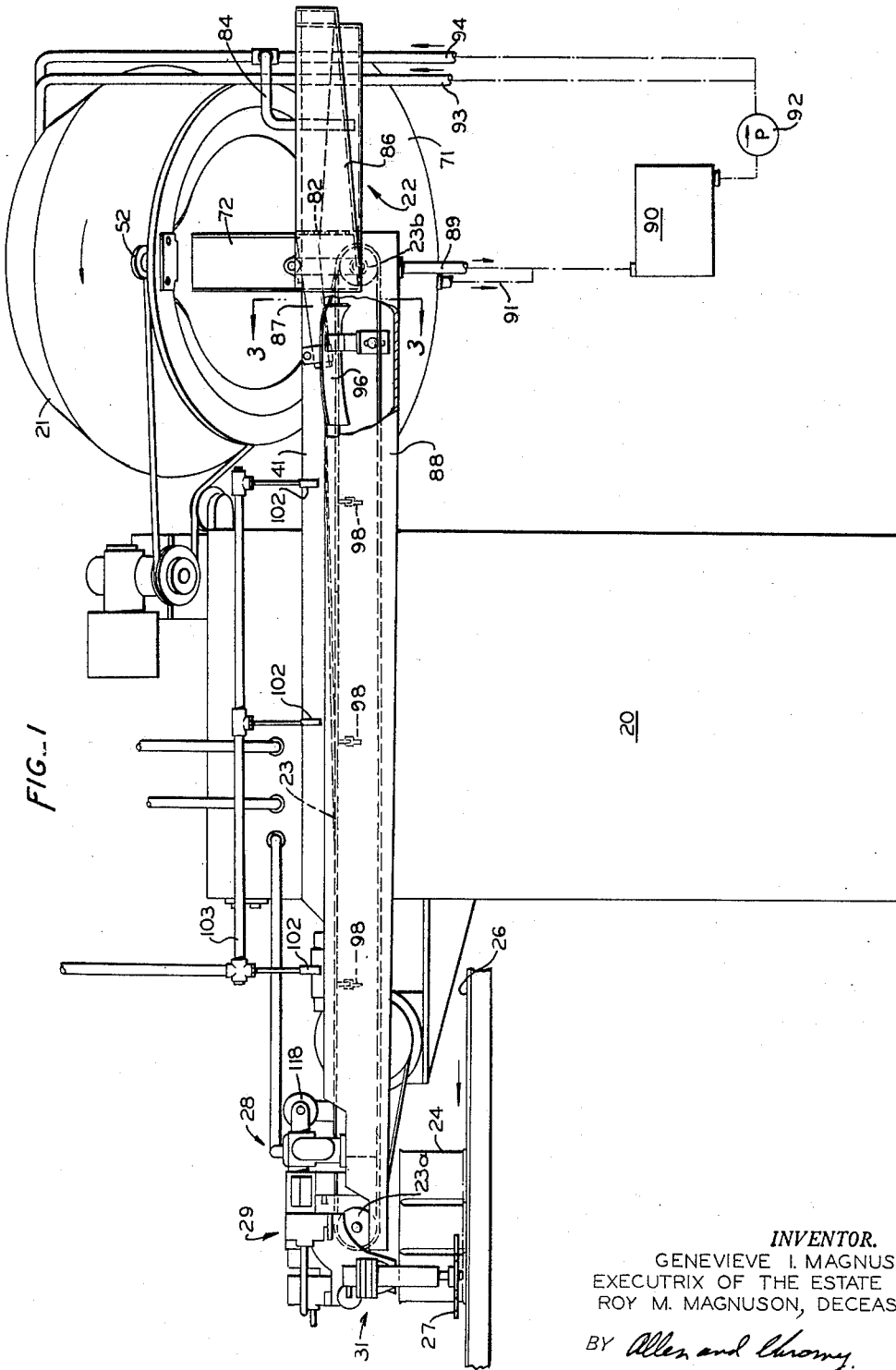
FIG. 1 is an elevational view of an apparatus for filling articles by count into a container and embodying the single-filing mechanism of the instant invention.
Figure 2:
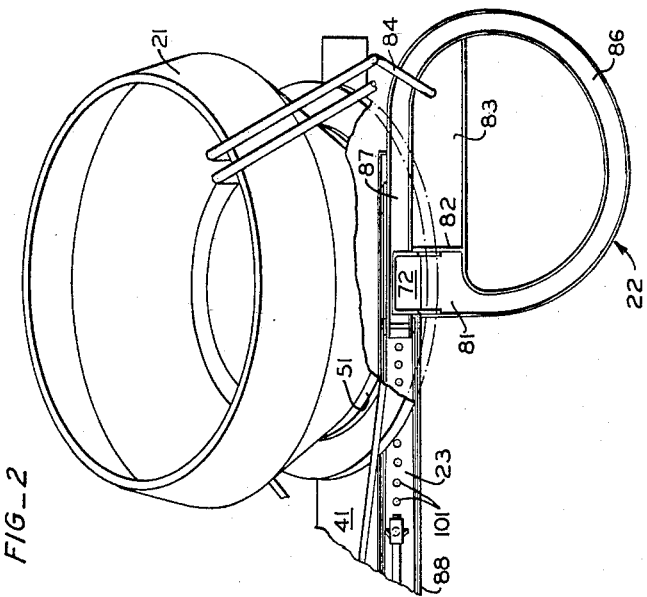
FIG. 2 is a partial plan view of the apparatus shown in FIG. 1.
Figure 3:
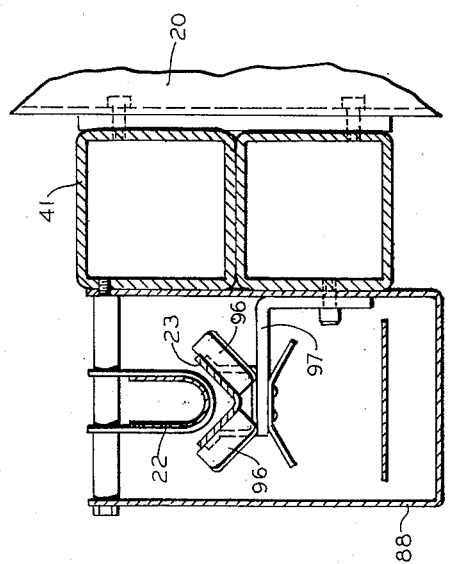
FIG. 3 is a sectional elevational view taken on a plane indicated by the line 3—3 in FIG. 1.

Referring first to FIGURES 1, 2 and 3 the apparatus includes a base 20, which may be in the form of a cabinet for housing various control elements, and on this base 20 there is mounted a rotary feed hopper 21 of suitable construction into which a supply of cherry halves is placed. The feed hopper 21 discharges cherry halves in substantially a single file onto a conveying system including a single filing chute 23, and a conveyor 23 both of which serve to further singulate the half cherries. Adjacent the discharge end of the feed belt 23 there are provided two parallel files of containers or cans 24 supported upon a constantly operating belt type conveyor 26, each file being restrained by a star wheel 27. Positioned adjacent the discharge end of the belt 23 is a sensing or phototube unit 28 having means for passing a light ray across the belt so as to be interrupted by the half cherries. This phototube unit 28 supplies the electrical impulse to a suitable counting circuit housed in the cabinet 20.

Also adjacent the discharge end of the conveyor 23 is an air jet unit 29 which preferably includes opposed air jets, one of which is always operative and the other inoperative, with the operative and inoperative conditions thereof reversed at the end of a desired count so that half cherries are fed first to a can in one file and then are diverted by the other air jet to a can in the other file.

At the time the count is concluded the container feed means 31 is operated from the counter to release the can into which cherry halves have been fed and to restrain the next succeeding can.

A continuous substantially single file arrangement of articles such as half cherries is fed from the feed hopper through the discharge chute 72, and means are provided for receiving this substantially continuous flow in substantially single file and for further establishing a definite single file in the event of overlapping or piling up of articles, and for insuring a separation between adjacent articles at least insofar as placing them in a single file relation is concerned.

For this purpose the circular chute or flume 22 previously referred to is provided, this chute providing an ascending path of travel for the cherry halves and the liquid carrying them until it discharges onto the single file conveyor 23. The discharge chute 72 leads into a cherry feed portion 81 of the flume immediately adjacent a perforated wall 82 separating the cherry feed portion 81 from a water feed portion 83 into which a water feed pipe 84 discharges. The flow of water from the pipe 84 into the feed portion 81 continues around a curved trough or flume 86 on a path having a constantly ascending bottom, leading to a downwardly inclined discharge portion 87 at which place the singulated cherries and the water are accelerated and discharged onto the single file conveyor 23, this conveyor being suitably perforated at the center to discharge water therethrough. The level of water in the flume 86 gradually decreases, as the flow of water accelerates until it arrives at the discharge portion 87 where the depth of the water is insufficient to allow passage of two superposed cherry halves. This in effect completes the singulating operation on the cherry halves.

Associated with the flume 22 is the single file feed belt 23 previously referred to and this belt is trained about a driving drum 23a (FIGURE 1) at its discharge end and an idler drum 23b at its feed end, suitably journaled on the frame member 41. The driving drum 88 (FIGURE 2) is driven through a belt and pulley mechanism 95 from a variable speed motor 96 of conventional construction.

The belt 23 is positioned in a drain trough 88 supported on the frame member 41 and having its lowest end at the right of FIGURE 1 from which a drain pipe 89 leads to a reservoir 90. The drain pipe 91 from the trough 71 discharges into this reservoir. A suitable impelling pump 92 withdraws liquid from the reservoir and supplies it to the pipes 93 and 94.

The belt 23 (FIG. 1) receives a centrally positioned stream of water and cherries from the flume 22 and is driven at a relatively fast rate, faster than the rate of travel of the water and cherries out of the flume 22. This V-shaped configuration of the belt 23 is provided by opposite angled support members 96 (FIGURES 1 and 3) carried by a frame angle 97. The V-shaped arrangement of the upper stretch of the belt 23 is gradually decreased to a substantially flat configuration as the belt passes over resilient wiper members 98. The members 98 serve to wipe water from the bottom surface of the belt 23 as it drains through central perforations 101. A plurality of downwardly directed air jets are provided by a series of nozzles 102 depending from an air supply pipe 103. Each nozzle 102 is immediately adjacent and ahead of a wiper member 98.

The control of the discharge of the cherries from the belt 23 is controlled as described in said application Serial No. 602,355.

Half cherries are placed in the rotating bowl 21 (FIGURES 1 and 2), and with the rest of the parts in "On" condition, the half cherries are fed in substantially single file out of recess 59 at the upper portion of its travel and fall down the chute 72 (FIGURES 1 and 2) into the flume 22. The water in the flume 22 progresses along a path of decreasing cross-section and accelerates to a point where the width and depth of the flume 22 are decreased to permit passage of only one half cherry. As the liquid and cherries flow down the discharge portion 82 the liquid is accelerated to space the half cherries apart. As the result a substantially single file of half cherries and water are discharged onto the conveyor 23 (FIGURES 1 and 3) where it is supported in substantially V-shaped fashion by the plates 96.

The perforations 101 (FIGURE 2) in the belt 23 serve to permit discharge of the water and tend to concentrate the half cherries in the center by virtue of the inward flow of water to these discharge perforations. Wipers 98 (FIGURE 1) and air jets from the nozzles 102 also assist in freeing the upper stretch of the belt 23 of water.

As a result of the above operations a single file of half cherries will approach the discharge zone of the belt 23 substantially in centered relation on the belt, and either cut side up or cut side down.

While there is shown and described a preferred embodiment of the invention, it will be apparent the invention is capable of variation and modification from the form shown, so that the scope thereof should be limited only by the proper scope of the claims appended hereto.

What is claimed is:

1. In an apparatus for effecting a single file relation of articles of variable shape, a flume having an article receiving portion and an article discharge portion, said flume having a bottom wall inclined upwardly from the article receiving portion to the article discharge portion, and also having a width at least at said article discharge portion to allow passage of only one article therethrough at a time, means for controlling the level of liquid in said flume to provide a depth at said discharge portion which allows passage therethrough of only one article, whereby to effect a single file relationship of articles in said discharge portion, and means in said discharge portion for causing travel of the liquid and the single file of articles downwardly to cause spacing apart of the articles in the single file.

2. In an apparatus for effecting a single file relation of articles of variable shape, a flume having an article receiving portion and an article discharge portion, said flume having a bottom wall inclined upwardly from the article receiving portion to the article discharge portion, and also having a width at least at said article discharge portion to allow passage of only one article therethrough at a time, means for controlling the level of liquid in said flume to provide a depth at said discharge portion which allows passage therethrough of only one article, whereby to effect a single file relationship of articles to said discharge portion, means for accelerating the liquid to cause spacing apart of the articles in the single file, and means for then removing the liquid from the articles.

3. In an apparatus for feeding articles in a single file, a flume for receiving articles, said flume having a bottom wall inclined upwardly from adjacent the point of receiving articles to a location where the depth of the liquid prevents the superposing of articles, means for feeding liquid to said flume to effect the article carrying flow therein, and an article conveyor for receiving the discharge from said flume.

4. In an apparatus for feeding articles as recited in claim 3 in which said article conveyor has means forming perforations along the center thereof, and means for effecting a substantially V-shape of a portion of said article conveyor for receiving the feed of articles thereto.

5. In apparatus for feeding articles as recited in claim 3 in which a downwardly inclined flume portion is interposed between said location and said article conveyor to accelerate the articles during discharge.

References Cited in the file of this patent

UNITED STATES PATENTS

| | | |
|---|---|---|
| 2,572,733 | Slagle | Oct. 23, 1951 |
| 2,644,569 | Francisco | July 7, 1953 |